May 16, 1939.    F. A. REECE    2,158,199
BUTTON SEWING MACHINE
Filed Jan. 24, 1936    14 Sheets-Sheet 1
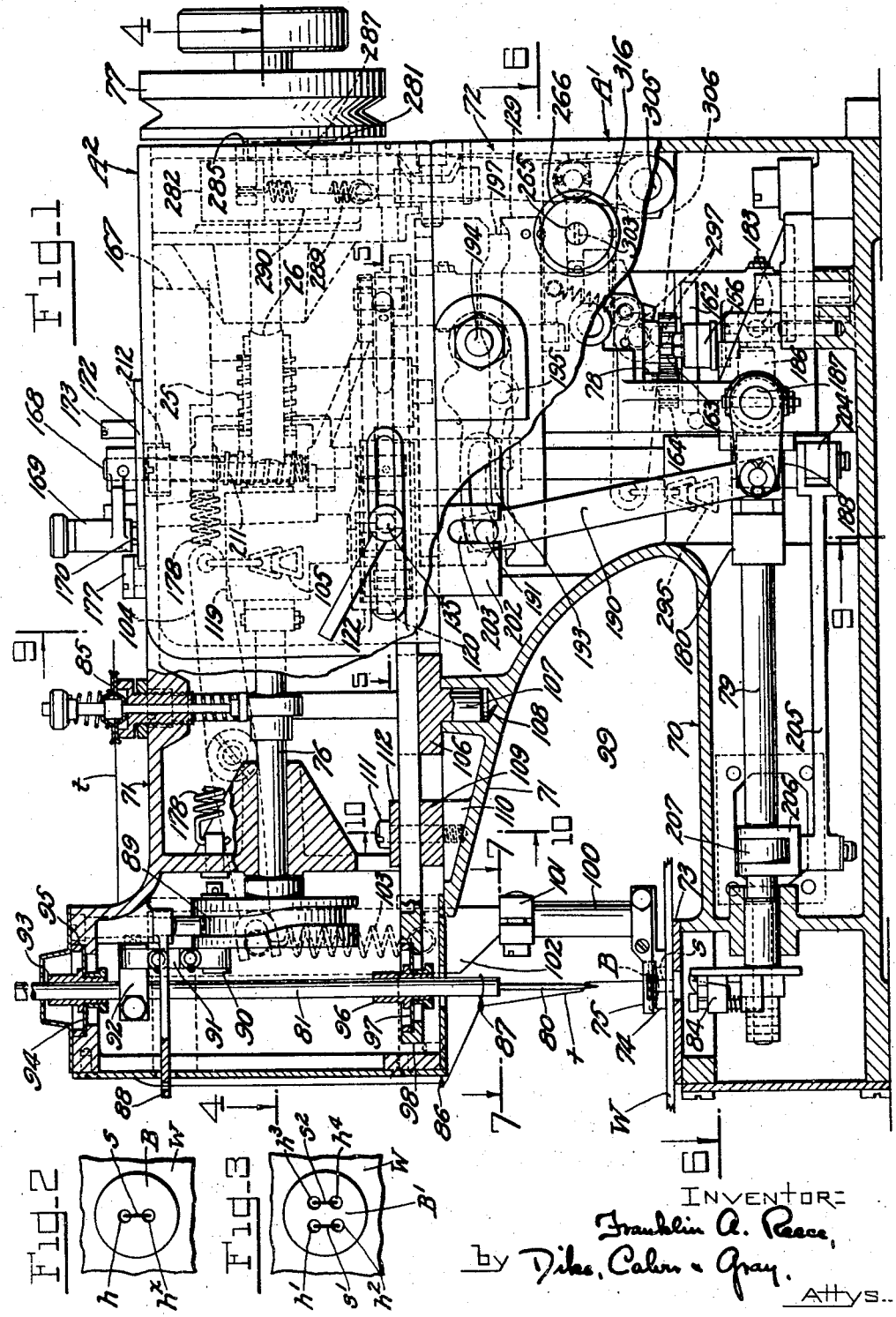

May 16, 1939.  F. A. REECE  2,158,199
BUTTON SEWING MACHINE
Filed Jan. 24, 1936  14 Sheets-Sheet 2
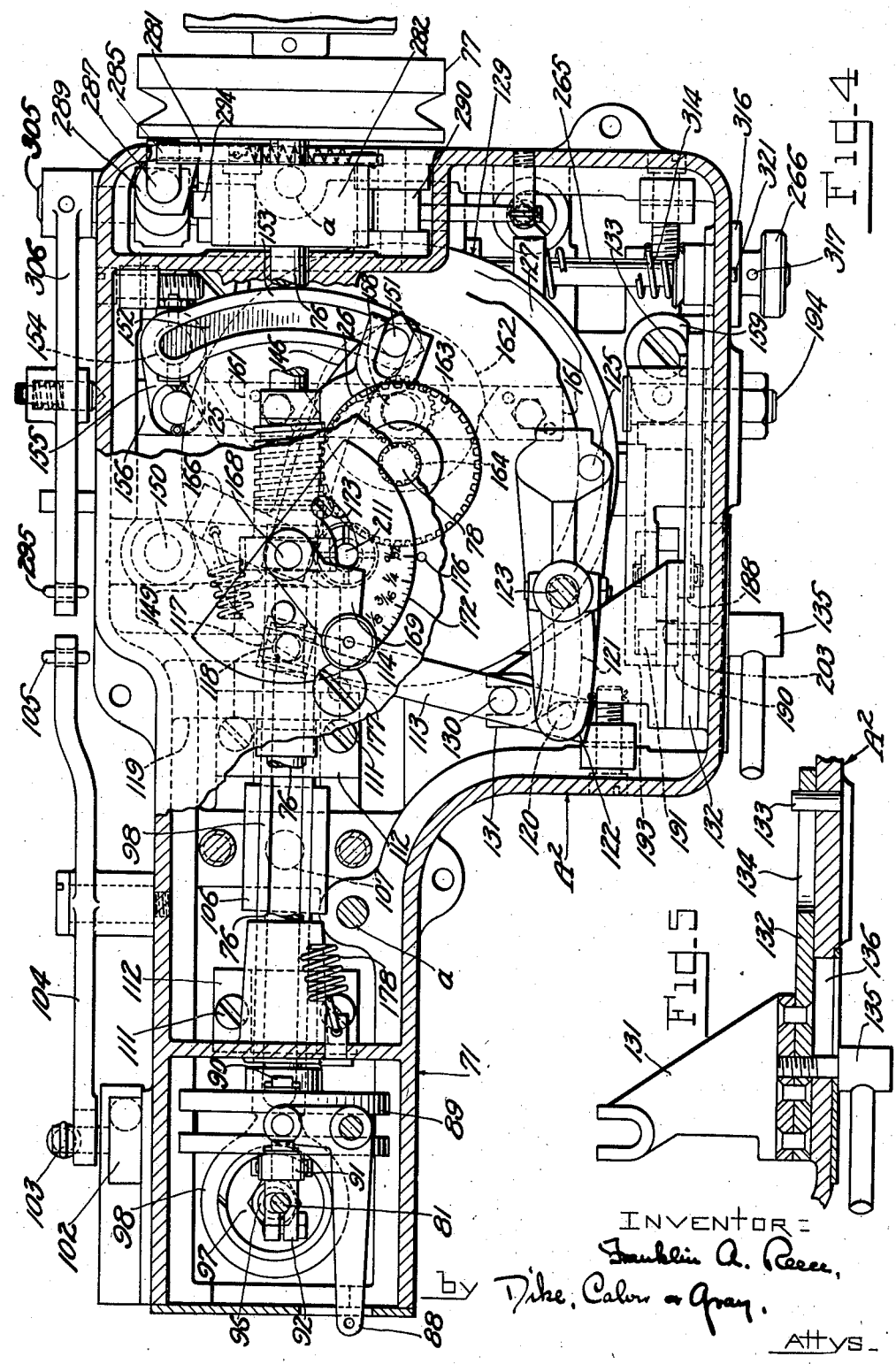

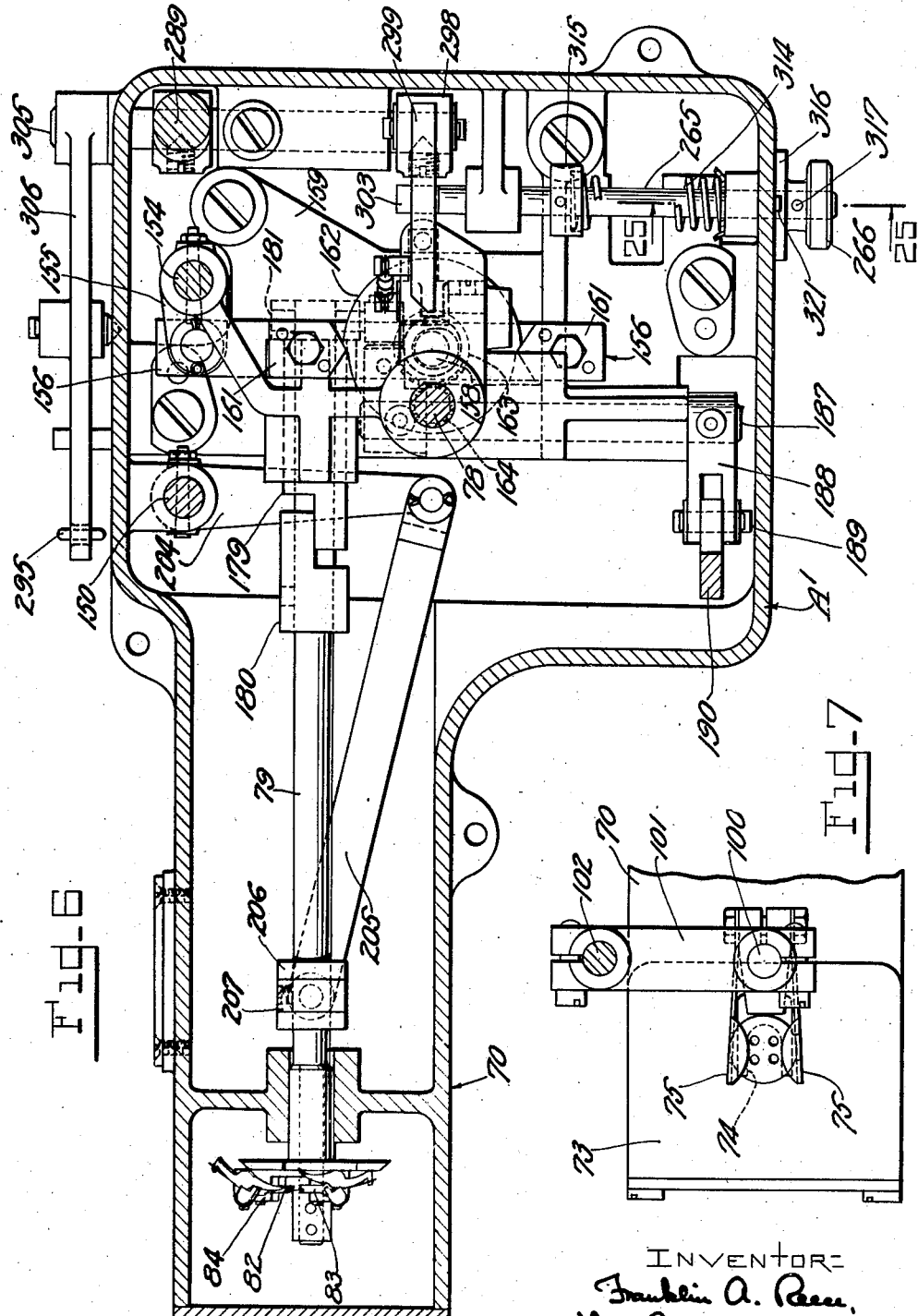

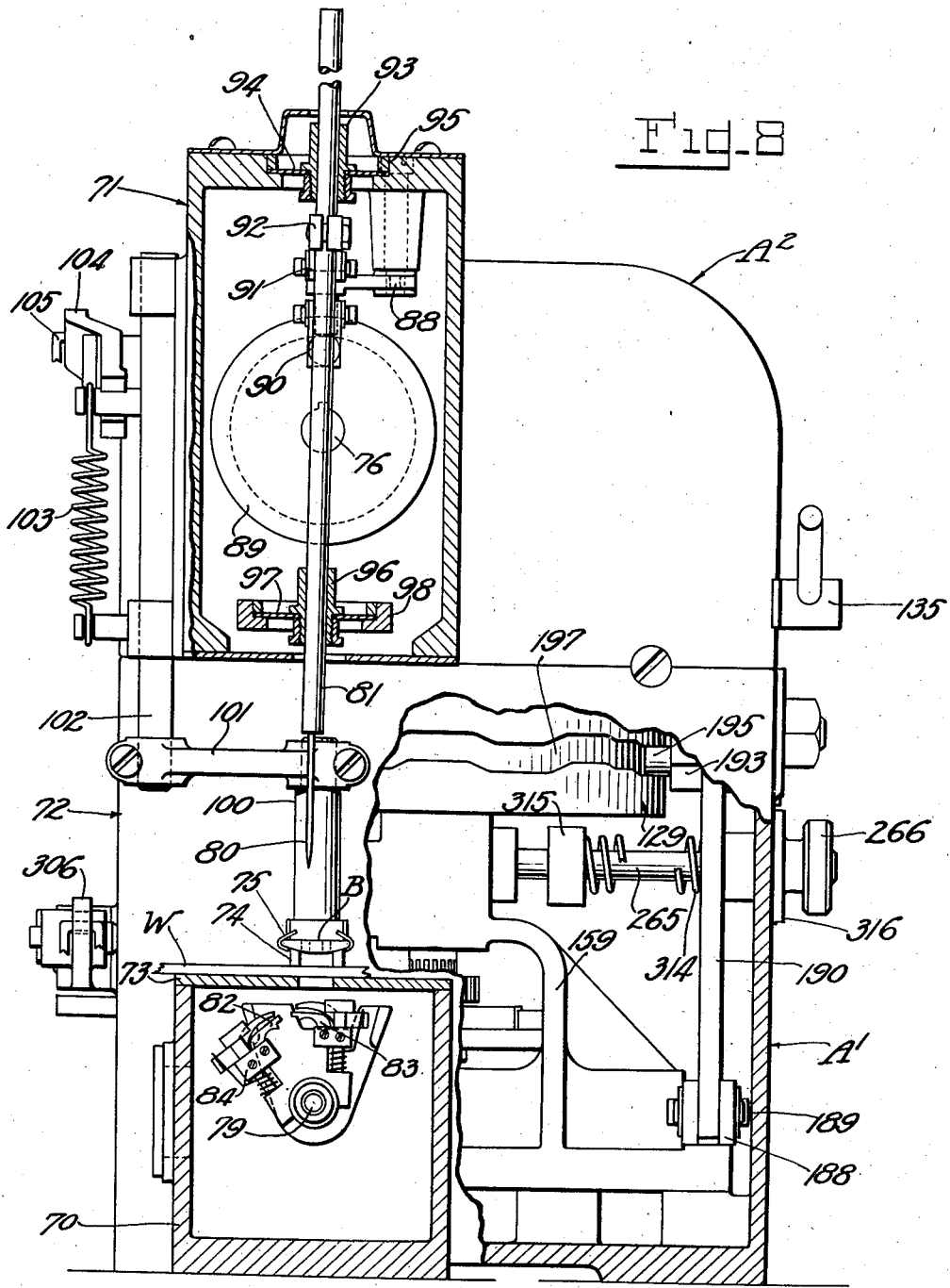

May 16, 1939.   F. A. REECE   2,158,199
BUTTON SEWING MACHINE
Filed Jan. 24, 1936   14 Sheets-Sheet 5
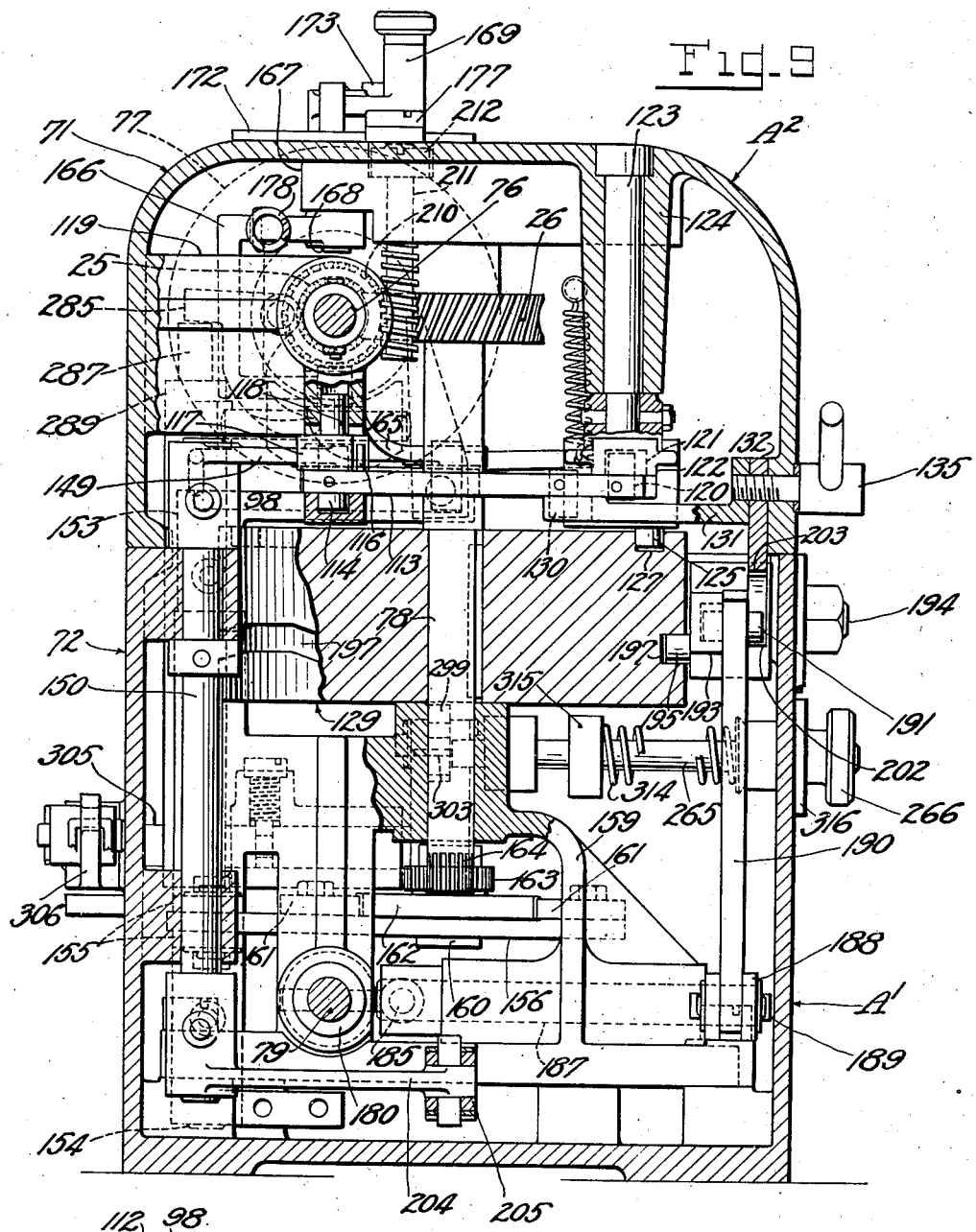

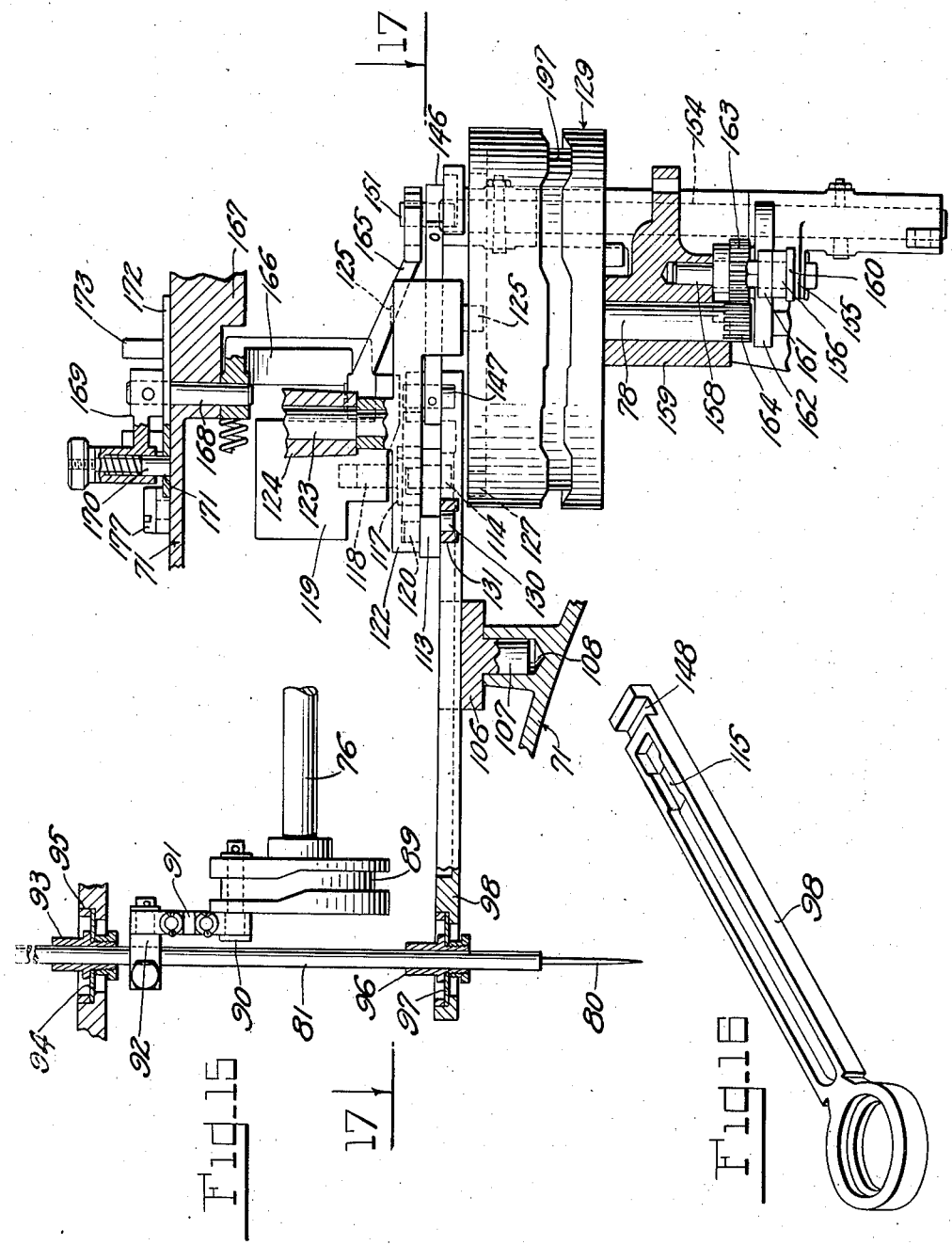

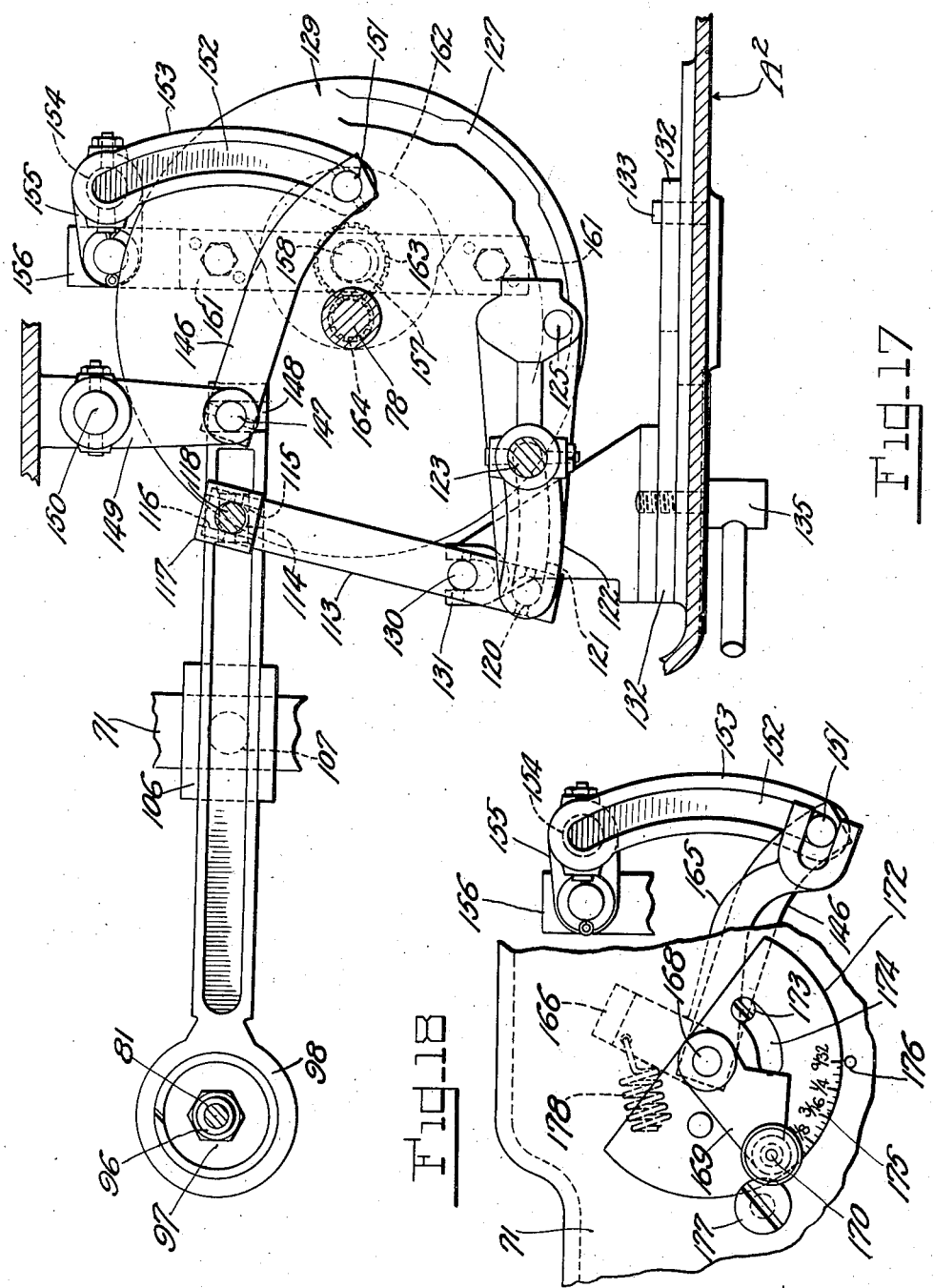

May 16, 1939.  F. A. REECE  2,158,199
BUTTON SEWING MACHINE
Filed Jan. 24, 1936   14 Sheets-Sheet 9
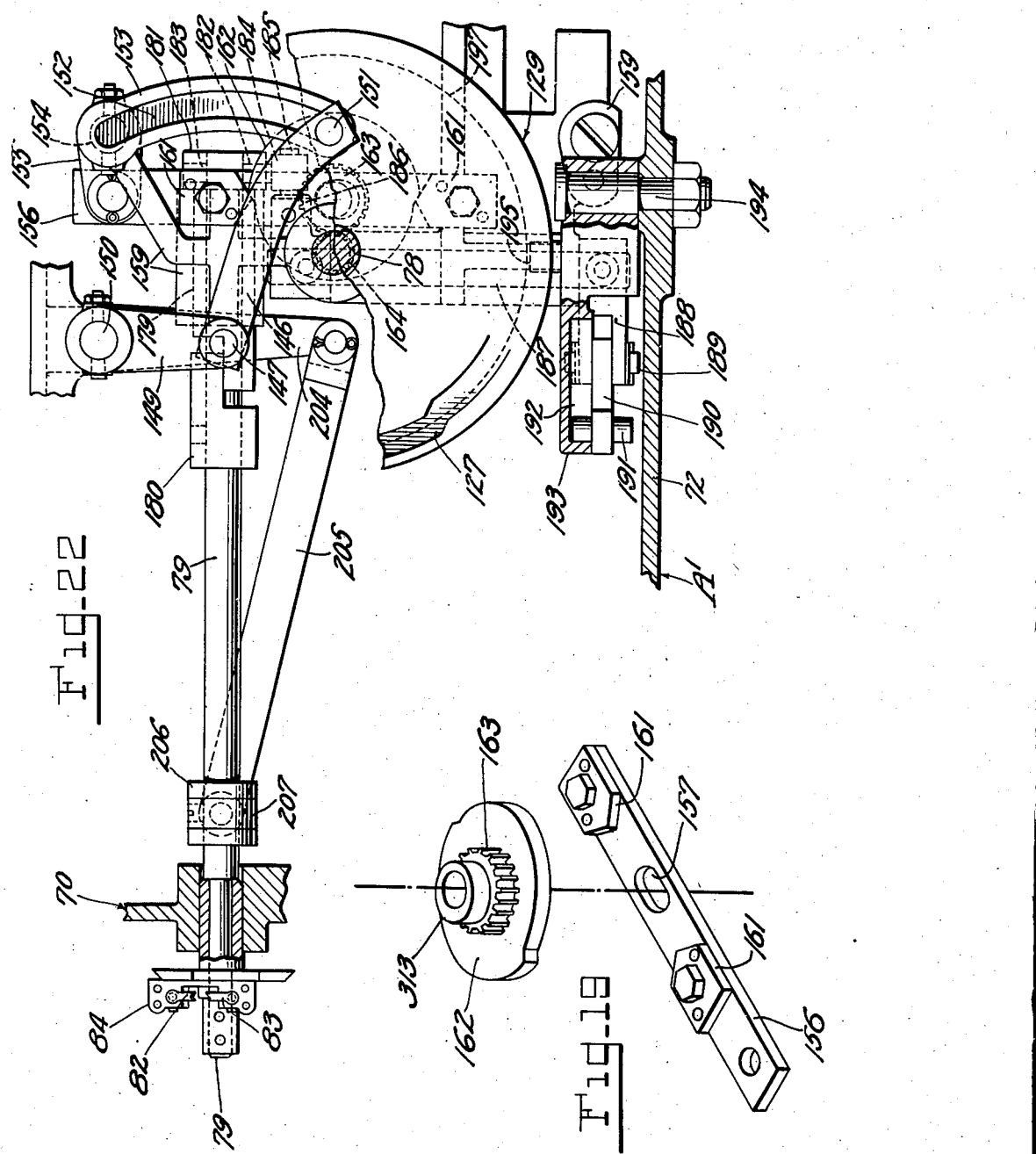
INVENTOR:
Franklin A. Reece,
by Dike, Calver & Gray, Attys.

May 16, 1939.   F. A. REECE   2,158,199
BUTTON SEWING MACHINE
Filed Jan. 24, 1936   14 Sheets-Sheet 10
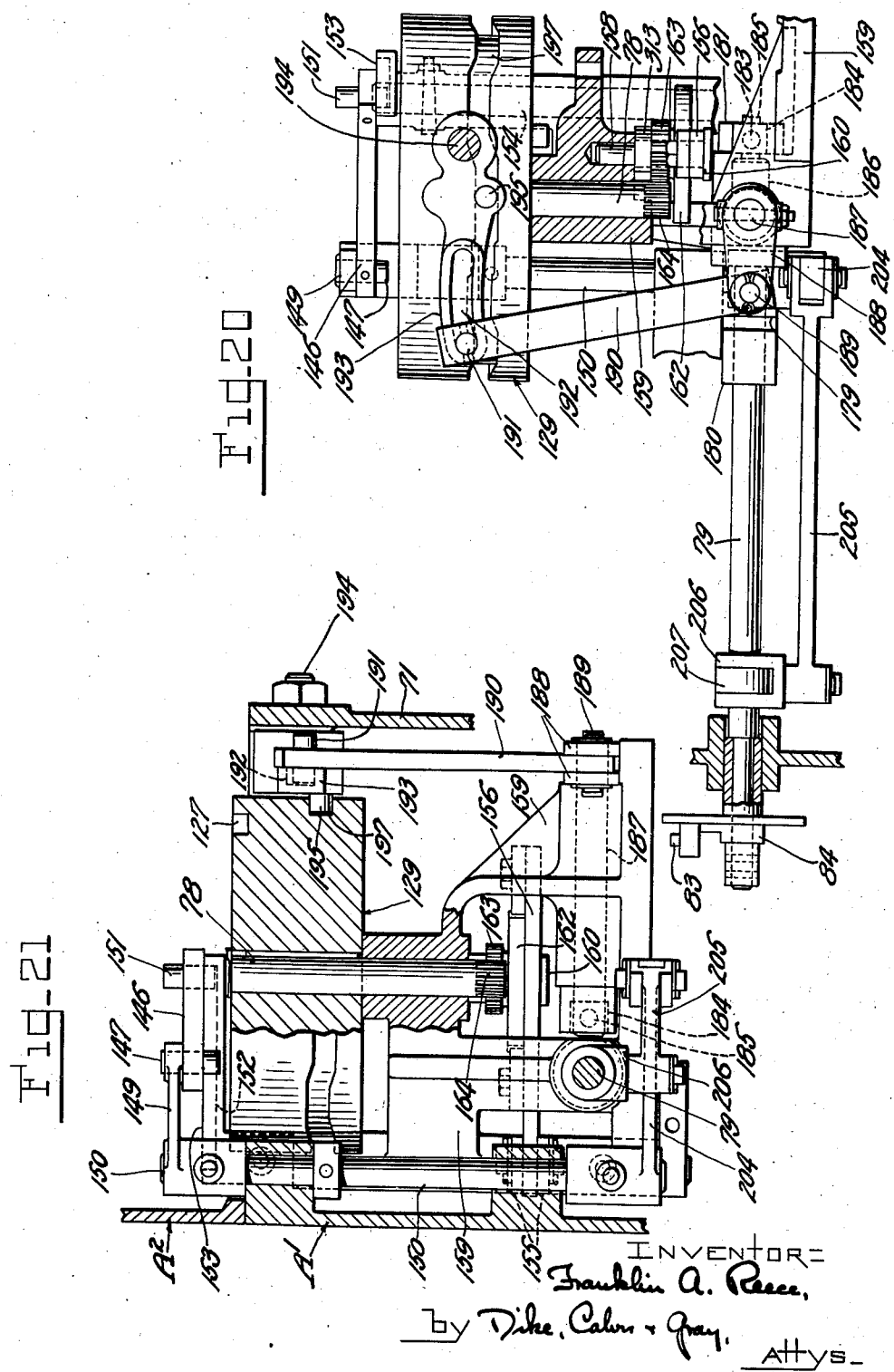

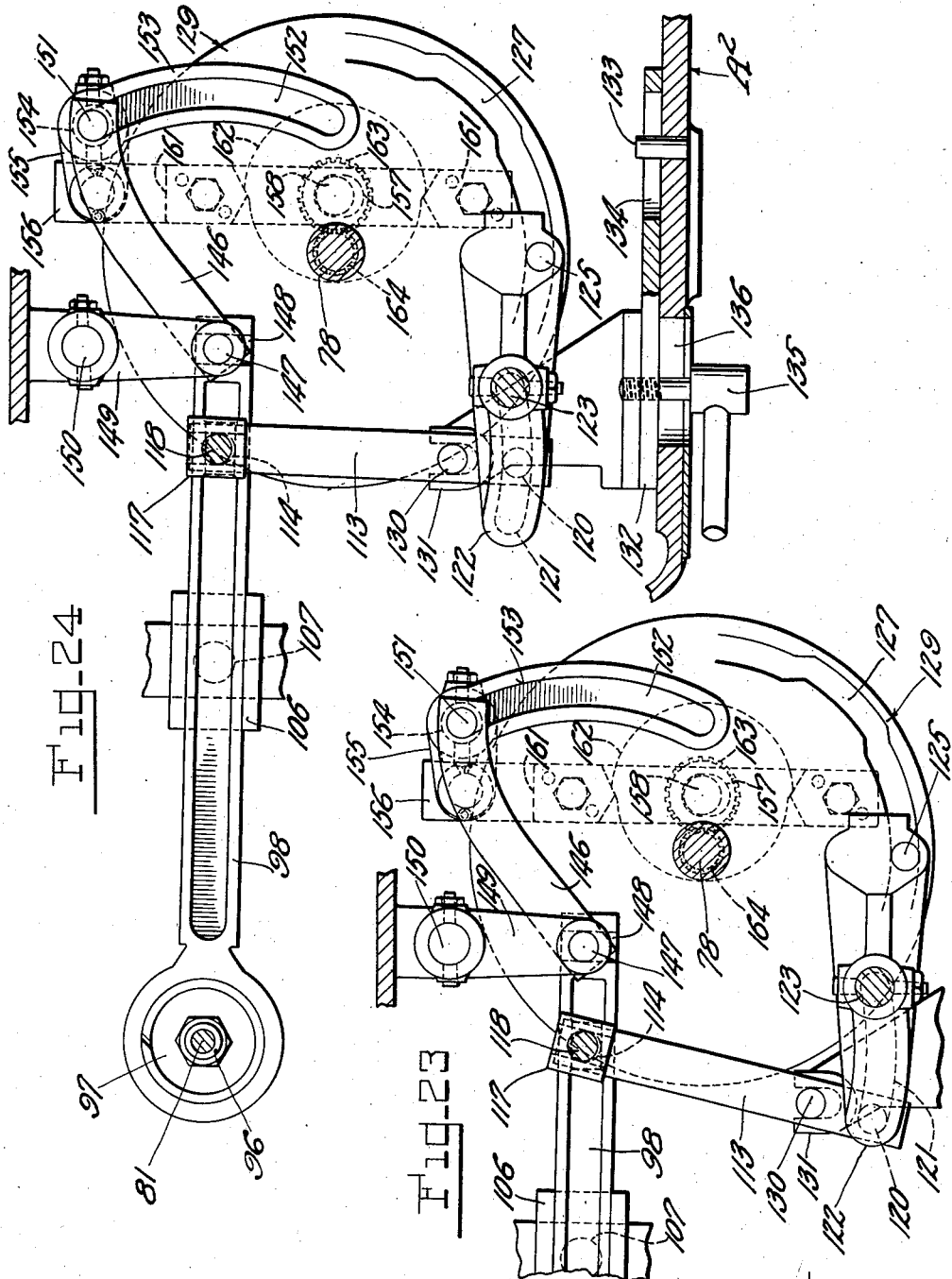

May 16, 1939.　　　F. A. REECE　　　2,158,199
BUTTON SEWING MACHINE
Filed Jan. 24, 1936　　　14 Sheets-Sheet 12
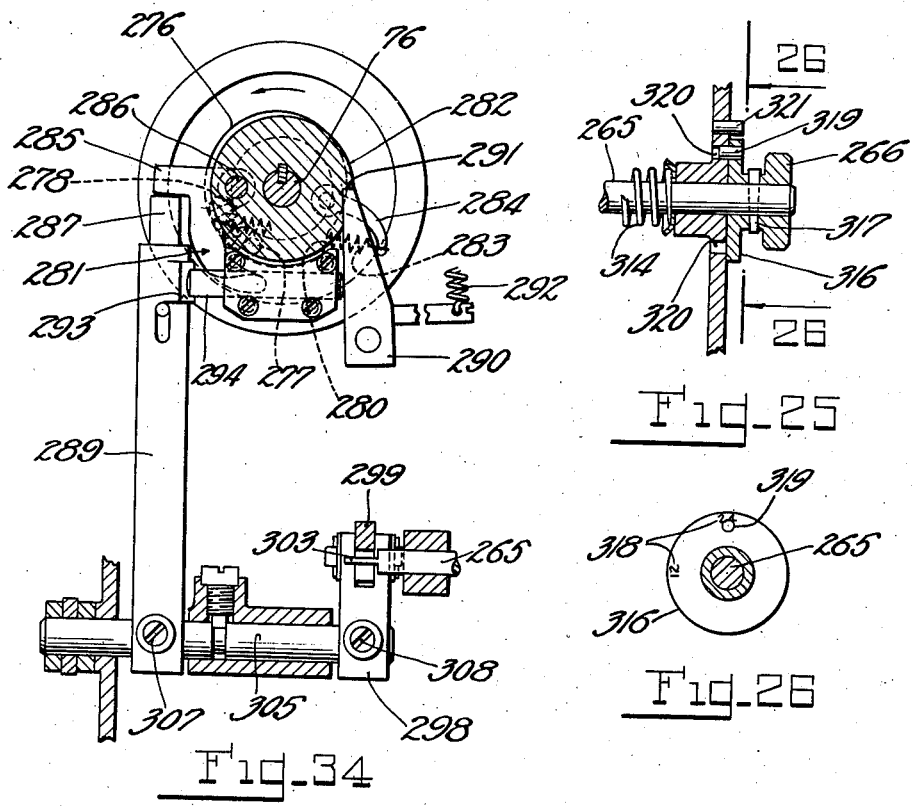
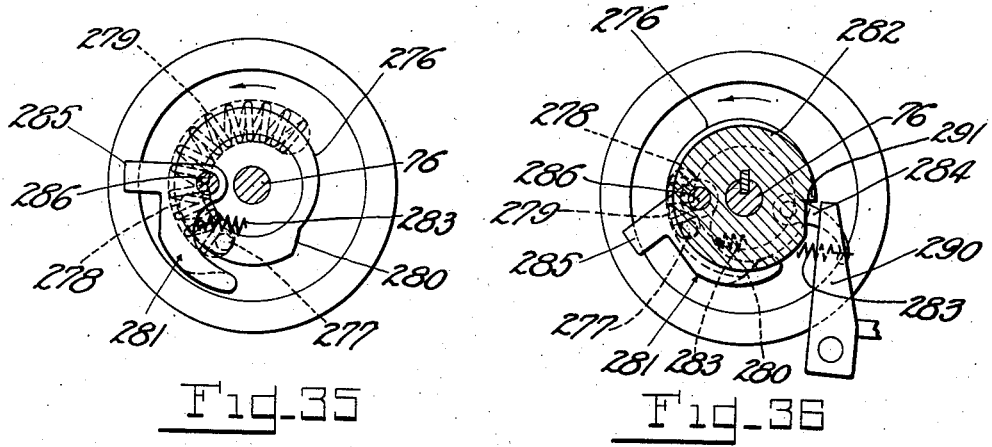
INVENTOR:
Franklin A. Reece,
by Dike, Calver & Gray.
Attys.

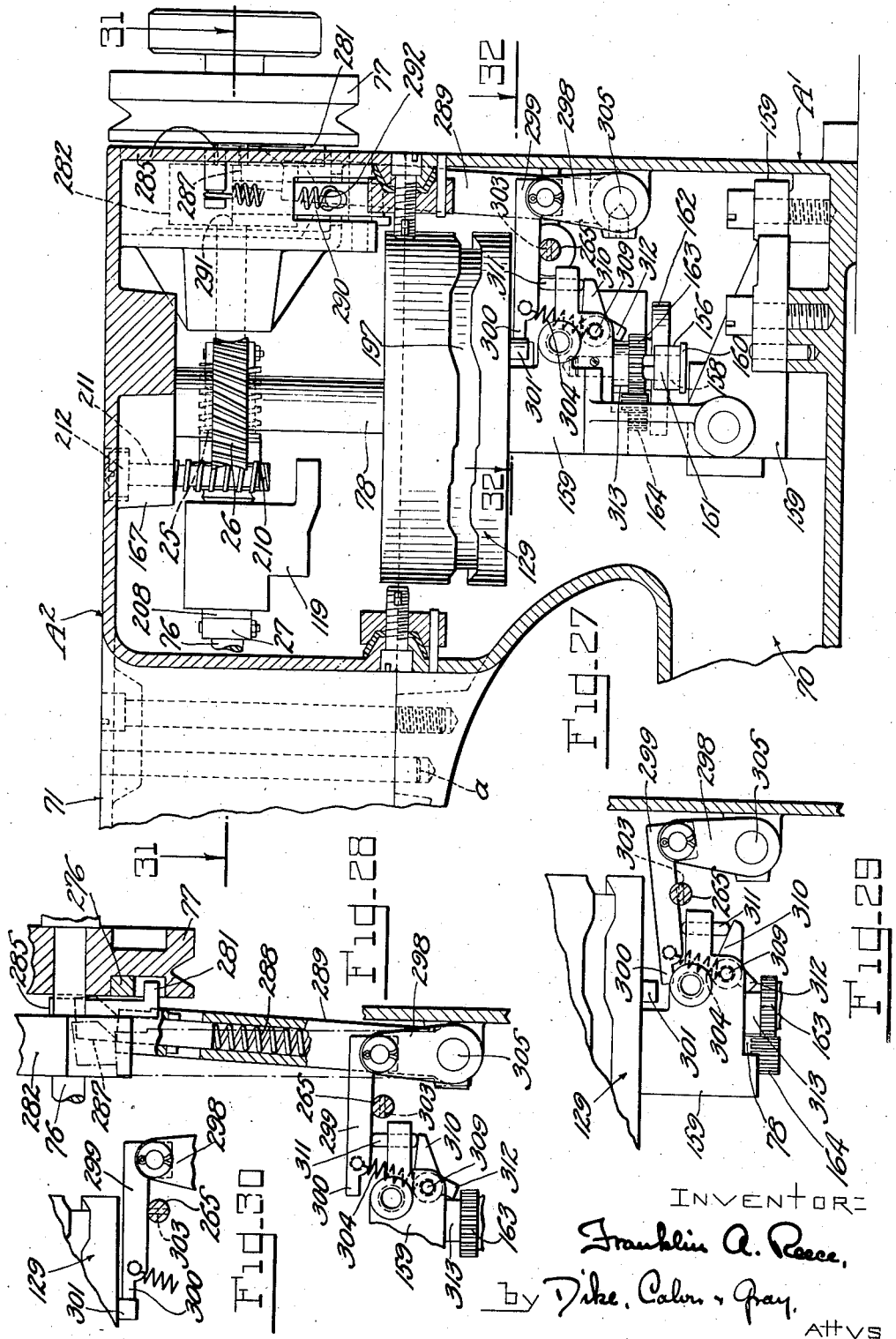

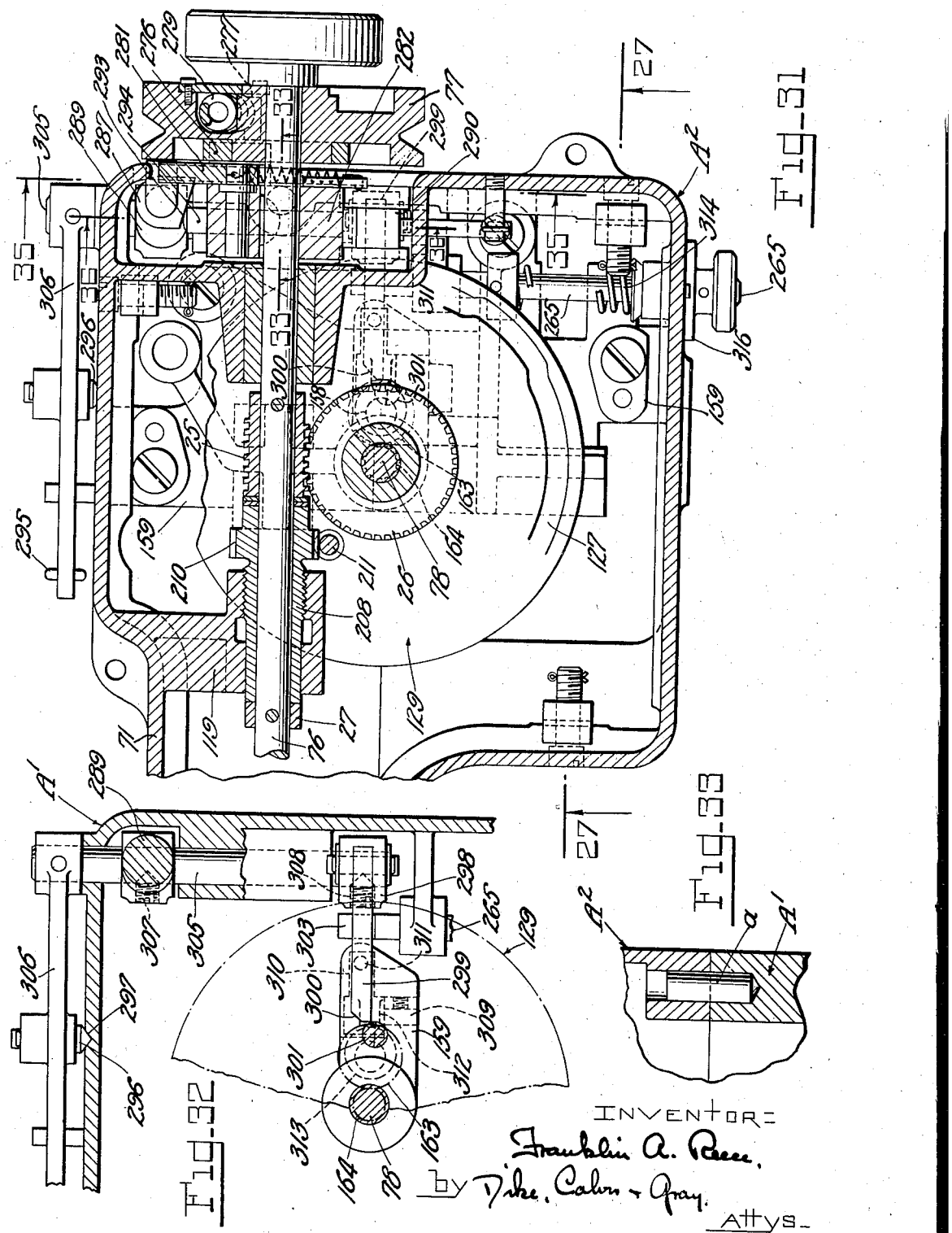

Patented May 16, 1939

2,158,199

UNITED STATES PATENT OFFICE 2,158,199

BUTTON SEWING MACHINE

Franklin A. Reece, Brookline, Mass.

Application January 24, 1936, Serial No. 60,616

28 Claims. (Cl. 112—111)

This invention relates to machines for sewing on buttons, especially substantially flat buttons having perforations or holes through which the attaching thread is passed. Such buttons are of a wide variety of shapes and sizes, the number and spacing of the thread receiving holes differing in different buttons, and the number of stitches required for their satisfactory attachment varying with the number of holes, the size of the buttons, and the purpose and location of their attachment.

The present invention has for a general object the provision of an improved button sewing machine which can, by simple adjustments readily effected by the ordinary operator, be set to attach either a two-hole or a four-hole button, having holes of any spacing within the range of the machine, by means of a variable number of groups of superimposed stitches, the thread being secured by a tying stitch at the completion of each group of attaching stitches. The machine is entirely automatic in its operation and, having been set in operation with the work properly positioned therein, will perform and complete the sequence of operations for which it has previously been set or adjusted and thereafter come to rest.

In machines for sewing four-hole buttons it has heretofore been customary to impart to the needle a lateral jogging motion (in addition to its vertical reciprocation) in order to cause it to pass alternately through the holes of one pair, after which the work is shifted horizontally in a direction transverse to that of the jogging motion to bring the other pair of holes into position for cooperation with the needle. This necessitates the provision of work clamps and devices for moving the same, and the location of these instrumentalities in the space between the head and the bed of the machine, thereby obstructing this space and making it difficult, if not impossible, to attach buttons elsewhere than closely adjacent the edge of the material. An important object of the present invention is to overcome this difficulty by the complete elimination of the movable work clamps and their operating devices, leaving between the head and the bed of the machine an unobstructed space wherein a considerable quantity of goods can be gathered, thereby making it possible to attach a button (for example, a pocket or trimming button) at a considerable distance from the edge of the goods. To this end, the invention contemplates the provision of mechanism whereby all of the movements necessary to attach either a two-hole or a four-hole button are imparted to the stitch-forming instrumentalities.

Another object of the invention is to provide stitching-forming mechanism suitable for the attachment of buttons and comprising cooperating instrumentalities shiftable in unison to maintain their cooperative relationship while operating upon the work at different points, as in sewing through the respective pairs of holes of a four-hole button.

The foregoing and other objects of the invention, together with means whereby the latter may be carried into effect, will best be understood from the following description of an illustrative embodiment thereof shown in the accompanying drawings. The particular mechanism described and shown has, however, been chosen for purposes of exemplification merely, as it will be obvious to those skilled in the art that the invention, as defined by the claims hereunto appended, may be otherwise embodied without departure from the spirit and scope thereof.

In said drawings:

Fig. 1 is a side elevation, partly broken away, of the complete machine.

Figs. 2 and 3 are detail views illustrating the attachment of two different types of buttons.

Fig. 4 is a horizontal section taken substantially on the line 4—4, Fig. 1.

Fig. 5 is a detail section on the line 5—5, Fig. 1.

Fig. 6 is a horizontal section taken substantially on the line 6—6, Fig. 1.

Fig. 7 is a detail section taken substantially on the line 7—7, Fig. 1.

Fig. 8 is a front elevation, partly broken away, of the complete machine.

Fig. 9 is a vertical section taken substantially on the line 9—9, Fig. 1.

Fig. 10 is a detail section taken substantially on the line 10—10, Fig. 1.

Fig. 15 is a fragmentary detail view of the mechanisms for producing the various movements of the needle.

Fig. 16 is a detail perspective view of the lower needle bar guide carrier through which the horizontal movements of the needle are effected and controlled.

Fig. 17 is a plan view, partly in section on the line 17—17, Fig. 15.

Fig. 18 is a detail plan view, looking from the top of Fig. 15 of the devices for adjusting the mechanism to vary the amplitude of the fore and aft movements of the stitch-forming devices.

Fig. 19 is a detail perspective view of certain of the elements of the mechanism shown in Figs. 15 and 17.

Fig. 20 is a fragmentary detail view of the mechanism for effecting and controlling the movements of the looper carrier and loopers.

Fig. 21 is a similar view looking from the left in Fig. 20, with certain parts added.

Fig. 22 is a fragmentary plan view of the same mechanism.

Figs. 23 and 24 are views similar to Fig. 17 showing different adjustments of the parts to vary the needle movements in accordance with the work to be done.

Fig. 25 is a detail section taken substantially on the line 25—25, Fig. 6.

Fig. 26 is a detail section taken substantially on the line 26—26, Fig. 25.

Fig. 27 is a fragmentary longitudinal vertical section taken substantially on the line 27—27, Fig. 31, of the rear portion of the machine, showing certain of the driving connections.

Figs. 28, 29 and 30 are fragmentary detail views of certain of the parts in Fig. 27, showing them in different positions.

Fig. 31 is a horizontal section taken substantially on the line 31—31, Fig. 27.

Fig. 32 is a detail section taken substantially on the line 32—32, Fig. 27.

Fig. 33 is a detail section taken substantially on the line 33—33, Fig. 31.

Fig. 34 is a fragmentary detail view of certain of the parts in Fig. 27.

Figure 11:
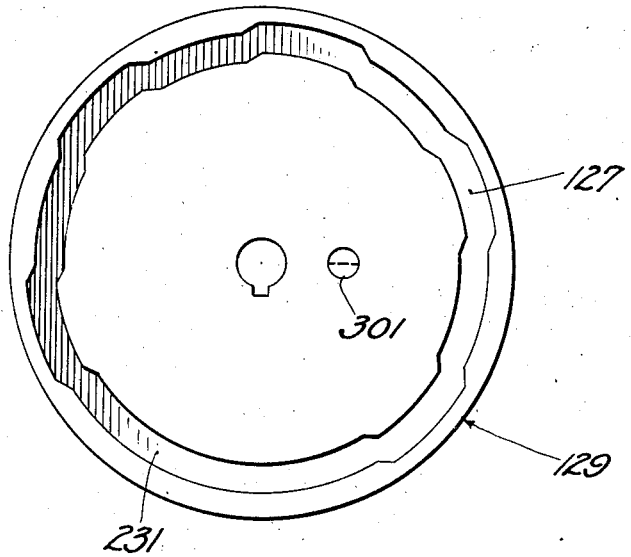
Fig. 11 is a plan view.
Figure 12:
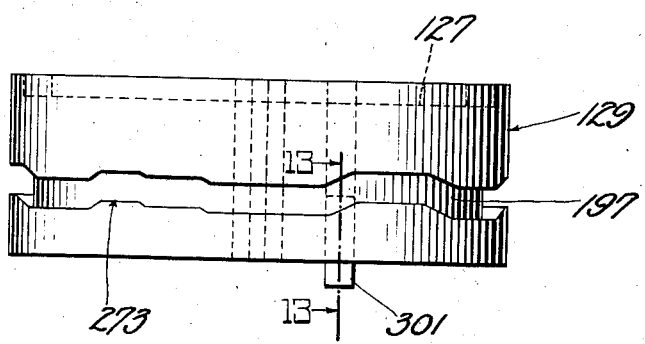
Fig. 12 is a side elevation of the main cam.
Figure 14:
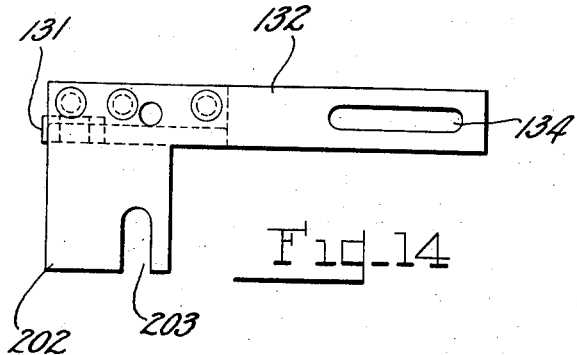
Fig. 14 is a detail view of a portion of the adjusting mechanism for controlling the amplitude of the lateral movements of the stitch-forming instrumentalities in accordance with the spacing of the holes in the button.

Figs. 35 and 36 are detail sections taken substantially on the lines 35—35 and 36—36, respectively, Fig. 31, showing the parts in different positions.

Referring to Figs. 1, 4, 6, 8 and 9, the frame or casing of the machine comprises a base or bed 70 and an overhanging head 71 supported therefrom by an upright housing portion 72 enclosing the principal parts of the operating and controlling devices. For convenience of assembly and repair, said frame or casing comprises two separable main sections A' and A2 connected and relatively positioned by dowels a (Figs. 4, 27 and 33) and several attached minor parts all of which collectively afford the necessary enclosures, supports, bearings, etc., for the various moving parts.

The bed 70 carries a work plate 73 upon which the fabric W to which the buttons are to be attached is supported and against which it is clamped by a presser foot 74 carrying a button clamp 75 for holding the individual buttons and positioning them for the operation of the sewing instrumentalities.

The main driving and controlling instrumentalities include a main power shaft 76 journalled in suitable bearings in the head 71 and to which power may be applied through a belt pulley 77 under the control of automatic stop mechanism hereinafter described; a vertical cam shaft 78 journalled in suitable bearings in the housing 72, driven through a worm 25 and worm gear 26 from the main shaft 76, and provided with suitable cams for controlling the movements of the several instrumentalities; and a horizontal looper shaft 79 journalled in suitable bearings in the base 70 and operated and controlled from the cam shaft 78.

The stitch-forming instrumentalities include an eye-pointed needle 80 carried by a needle bar 81 mounted for vertical or longitudinal reciprocation in the head 71, and a pair of loopers 82 and 83 on a looper carrier 84 secured to the looper shaft 79 adjacent its forward end (see particularly Figs. 6, 8, and 22). Except as hereinafter mentioned, these instrumentalities may be substantially as shown and described in the Dahl Patent No. 862,238, August 6, 1907. The sewing thread $t$ is supplied to the needle 80 from a suitable source, not shown, through a tension device 85 and suitably arranged guides on the head and needle bar and shown, for example, at 86 and 87, under the control of the usual take-up 88 which, in this instance, is operated by a cam 89 upon the shaft 76.

The needle bar 81 is longitudinally reciprocated by a crank pin 90 carried by the cam 89 and connected by suitable linkage 91 with a collar 92 on said needle bar, and is guided adjacent its upper end in a bearing 93 which, as shown, is carried by a flexible metallic disk 94 suitably clamped in a recess 95 in the upper end of the head 71. This mounting of the needle bar guide 93 may be, and as shown is, substantially as more fully shown and described in the Reece Patent No. 1,993,350, March 5, 1935, and is such as to permit the needle bar a limited universal swinging movement about the point of intersection of its axis with the plane of the disk 94. Adjacent its lower end the needle bar is guided in a bearing 96 similarly mounted by means of a disk 97 in a carrier member 98 mounted, as hereinafter described, for movement in a horizontal plane both laterally and longitudinally of the machine frame.

In attaching a two-hole button B, as shown in Fig. 2, the carrier 98 is oscillated laterally, or in a plane transverse to the axis of the needle eye, between successive descents of the needle 80 to cause said needle to pass alternately through the holes $h$ and $h^x$ in the button, the looper carrier being at this time oscillated laterally by the shaft 79 to cause the loopers to cooperate with the needle in the formation of a group of superimposed stitches $s$ passing through said holes and serving to attach the button to the fabric W. In attaching a four-hole button, such as shown at B' in Fig. 3, the same operations are performed to form a group of attaching stitches $s'$ passing through the holes $h1$ and $h2$, after which the carrier 98 is shifted longitudinally, or in a direction fore and aft of the machine in substantially the plane of the axis of the needle eye, to bring the needle into the plane of the holes $h3$ and $h4$ of the other pair, the looper shaft 79 with the looper carrier 84 and loopers 82 and 83 being similarly shifted to maintain the cooperative relationship of said loopers with the needle. Thereafter the sewing operations are repeated to form a second group of attaching stitches $s2$ passing through the holes $h3$ and $h4$.

By reason of the fact that all of the relative movements of the stitch-forming instrumentalities and work necessary to cause the former to cooperate with the several holes of the button are imparted to the stitch-forming instrumentalities, the work plate 73, presser foot 74, and button holder 75, may remain stationary during the attaching operation, thereby eliminating all instrumentalities heretofore required for shifting the work in the attachment of a four-hole button. Consequently the space 99 between the bed 70 and the head 71 at the rear of the presser foot is entirely unobstructed, so that a considerable quantity of the material W can be rolled or folded into said space, permitting positioning on the work plate of a portion of the work quite remote from the edges thereof.

Specifically the presser foot 74 and button clamp 75 carried thereby form no portion of the present invention and may be of any construction and arrangement suitable to perform their intended functions and permit the operation of the stitch-forming instrumentalities as above described. As shown, the presser foot 74 is secured to a short upright rod 100 (see Figs. 1, 7 and 8) carried by an arm 101 projecting from a slide 102 guided for vertical movement in the head 71. The slide 102 is normally held downward to urge the presser foot against the work by a spring 103 but may be moved upwardly against the tension of said spring, to raise the presser foot, by a lever 104 connected by a chain 105 with a suitable treadle, not shown.

The carrier member 98 for the lower needle bar guide 96 is guided for longitudinal movement in a groove in the top of a head 106 (Figs. 1, 4, 15 and 17) having a shank or trunnion 107 received in a socket 108 in the bottom wall of the head 71 of the machine, whereby said head 106 is pivoted for oscillation about the axis of said shank. Said carrier is, therefore, free to move longitudinally in the head 106 or to oscillate laterally with said head about the pivotal axis of the latter. Said carrier is further held and guided for movement in a horizontal plane by channel members 109 (Figs. 1 and 10) each secured to bosses 110 on the bottom wall of the head 71 by bolts 111 (see also Fig. 4), said carrier being retained within the grooves of said channels by cover plates 112 secured in place by said bolts 111.

The carrier 98 is oscillated laterally about the axis of the pivot 107 to cause the needle to pass alternately through the holes $h$, $h^x$ (Fig. 2), $h'$, $h2$ (Fig. 3) or $h3$, $h4$, by mechanism most clearly shown in Fig. 17. Said mechanism comprises a link 113 having a pin or stud 114 (see also Fig. 9) a downwardly projecting portion of which is received in a longitudinally disposed way 115 (Fig. 16) in the upper face of the carrier 98, and an upwardly projecting portion of which is received in a way 116 in a head 117 having a shank 118 pivoted in a bracket 119 which projects inwardly from one of the side walls of the head 71. The way 116 permits lateral movement of the stud 114, and consequently lateral oscillation of the carrier, while holding said stud against longitudinal movement in the way 115; while the latter way permits longitudinal movement of the carrier 98 independently of said stud as hereinafter explained. The opposite end of the link 113 is provided with a stud 120 received in an arcuate groove 121 in one arm of a lever 122 (see also Figs. 9 and 15) secured to an upright shaft 123 journalled in a bearing 124 depending from the top of the head 71. At its opposite end the lever 122 carries a pin 125 which engages a cam groove 127 in the upper face of a main cam 129 fast on the vertical cam shaft 78. With this construction it will be seen that rotation of the cam 129 will cause the lever 122 to swing about the axis of the shaft 123, and that this movement will be transmtited from said lever to the carrier 98 through the link 113.

The amplitude of the lateral vibration thus imparted to the carrier 98 will depend upon the point of engagement of the stud 120 with the groove 121, and in order to permit this to be readily adjusted in accordance with the lateral spacing of the holes in the button, the link 113 is provided with a third stud 130 engaged by a fork 131 (see also Figs. 4, 5, 9 and 14) carried by a slide 132 guided for horizontal movement on the side wall of the head 71 by a stud 133 projecting inwardly from said wall and engaging a slot 134 in the slide and a clamp screw 135 projecting through a slot 136 in the wall and in threaded engagement with said slide. By loosening the clamp screw the slide 132 may be moved longitudinally, and by tightening said clamp screw it may be secured in adjusted position.

The mechanism for moving the carrier 98 longitudinally is likewise shown in Fig. 17 and comprises a link 146 having at its forward end a stud 147 received in a transverse groove or way 148 in the upper face of the carrier 98 adjacent its rear end. This construction permits the carrier to be swung laterally by the link 113, as above described, independently of the link 146 and stud 147. The stud 147 also pivotally connects the link 146 with an arm 149 (see also Fig. 21) on a vertical rock shaft 150 journalled in suitable bearings on the interior of the main casing, said connection serving to retain the stud 147 in the groove 148. At its rear end the link 146 carries a stud 151 which engages a groove 152 in an arm 153 secured to a second vertical rock shaft 154 (see also Figs. 9 and 20). Adjacent its lower end the rock shaft 154 has secured thereto an arm 155 having a bifurcated end between the branches of which is pivoted the end of a link 156 having a slot 157 (Fig. 19) to receive a stud 158 (Fig. 15) depending from a bracket or interior frame member 159 within the main casing and the form of which is most clearly shown in Fig. 9. The link 156 is, therefore, guided on the stud 158 by engagement of the latter with the slot 157 and is supported by a flange or head 160 on the lower end of the stud. The link 156 has secured thereto a pair of contact or cam-follower blocks 161 embracing between them and cooperating with an edge cam 162 rotatably mounted on the stud 158 and the hub of which is provided with a spur gear 163 meshing with a pinion 164 on the lower end of the main cam shaft 78. The gear 163 and pinion 164 are of such sizes as to constitute two to one gearing between the cam 162 and the cam shaft 78, so that the cam 162 is rotated at one-half the speed of the main cam 129. Accordingly, after one complete rotation of the cam 129 to cause the cam groove 127 thereof to produce a predetermined number of lateral reciprocations of the needle bar to form, for example, the group of stitches $s'$ (Fig. 3), the cam 162 will cause the carrier 98 and needle bar to be shifted longitudinally in one direction, after which a second rotation of the cam 129 will cause the necessary number of lateral reciprocations to form the group of stitches $s2$, whereupon the cam 162 will return the carrier and needle bar to their original longitudinal positions.

The amplitude of the longitudinal or fore and aft movement of the carrier 98 and needle bar 81 is determined by the position of the stud 151 in the groove 152 of the arm 153, and, in order that this may be conveniently adjusted in accordance with the fore and aft spacing of the holes $h1$, $h2$, and $h3$, $h4$, there is provided a fork 165 (Figs. 9, 15 and 18) carried by a yoke 166 the arms of which are co-axially pivoted in the bracket 119 and in a boss 167 in the top of the head 71 respectively. The pin 168 which constitutes the upper pivot of the yoke 166 extends through the top wall of the head 71 to the exterior of the latter and has secured thereto a hand lever 169. The hand lever 169 carries a manually releasable, spring pressed locking pin 170 which normally engages an opening 171 (Fig. 15) in a segmental index plate 172 mounted to turn about the pivot pin 168 to an extent limited by the engagement of a pin 173 on the top of the head with an arcuate slot 174 in said plate (see also Fig. 18). The plate 172 has on its edge a graduated scale 175 cooperating, as the plate is turned, with an index mark 176 on the top of the head, said plate being secured in adjusted position by a clamp screw 177. The handle 169 being normally locked to the plate 172 by the plunger 170, when said plate is turned into a predetermined position, as indicated by registration of the proper point on the scale 175 with the index mark 176, the stud 151 will be moved in the slot 152 to vary the amplitude of the fore and aft movement of the carrier 98, it being understood that the graduations on the scale 175 are suitable to indicate fore and aft spacing of pairs of holes in a four-hole button. A spring 178 is suitably connected with the yoke 166 to tend to turn the latter in a counter-clockwise direction as shown in Fig. 18, so that by releasing the locking pin 170, said spring will turn the yoke to cause the fork 165 to move the pin 151 into a position co-axial with the shaft 154, whereupon there will be no longitudinal movement of the carrier 98, thereby adjusting the machine for operation upon a two-hole button.

Figs. 4 and 17 show the adjustment of the parts for a four-hole button having the maximum hole spacing for which the machine is adapted. Fig. 23 shows the adjustment for a two-hole button of maximum hole spacing. Fig. 24 shows the adjustment for a two-hole button having holes more closely spaced. It will be obvious that for a four-hole button of closer spacing the adjustment would be similar to that shown in Fig. 24 but with the stud 151 in a position intermediate the positions shown in Figs. 17 and 23. The looper shaft 79 is slidably mounted at its rear end in a sleeve 179 (see Fig. 22) rotatably mounted in a suitable bearing in the frame member 159. Adjacent the forward end of the sleeve 179 the shaft 79 has secured thereto a collar 180, and the contiguous ends of said sleeve and collar are suitably formed to constitute the complementary elements of a slip coupling or clutch connecting the sleeve and shaft for oscillation in unison while permitting longitudinal movement of the shaft relative to the sleeve. At its rear end the sleeve 179 is formed with a head 181 having a transverse bore 182 in which a stud 183 is rotatably and slidably mounted. The stud 183 is provided with a head 184 (see also Figs. 20 and 21) having a transverse bore in which is slidably and rotatably received a stud 185 secured within and projecting longitudinally from the end of an arm 186 secured to one end of a transverse rock shaft 187 (see also Fig. 1) journalled in a suitable bearing in the frame member 159. By this construction the shaft 187 and sleeve 179, although disposed perpendicular to one another, are connected for oscillation in unison. At its opposite end the rock shaft 187 has secured thereto a bifurcated arm 188 between the bifurcations of which is pivoted at 189 the lower end of a link 190. The upper end of the link 190 is provided with a transverse stud 191 the inwardly projecting end of which is received in an arcuate groove 192 in one end of a lever 193 fulcrumed at its opposite end on a stud 194 projecting inwardly from the side wall of the housing 72. Intermediate its ends the lever 193 carries a pin 195 engaging a cam groove 197 formed in the side or periphery of the main cam 129. The groove 197 corresponds to the groove 127, that is to say, the number and timing of the oscillations of the looper shaft 79 produced by the former correspond to the number and timing of the lateral oscillations of the needle produced by the latter. Accordingly, the oscillations of the loopers are synchronized with the lateral oscillations of the needle, and it is obvious that the amplitude of the former must vary with the amplitude of the latter. The amplitude of oscillation of the looper shaft 79 depends upon the position of the stud 191 in the groove 192 of the lever 193, and in order that this position may be suitably adjusted concurrently with the adjustment of the position of the stud 120 in the groove 121 of the lever 122, the slide 132 (Fig. 14) by which the latter stud is adjusted is provided with a depending flange 202 having a slot 203 to receive the outwardly projecting end of the pin 191 (see also Fig. 1). Consequently, when the slide 132 is adjusted in accordance with the lateral spacing of the holes in the button, the studs 120 and 191 will be simultaneously adjusted to control both the lateral throw of the needle and the amplitude of vibration of the loopers, thereby maintaining the proper relation between the movements of said parts.

When the needle bar carrier 98 is shifted longitudinally, or in a direction fore and aft of the machine, in sewing a four-hole button, in order to transfer the operation of the needle from the plane of one pair of holes, for example, the holes $h1$, $h2$, to the plane of another pair, for example, the holes $h3$, $h4$, the looper shaft 79 must be likewise shifted longitudinally to maintain the proper cooperative relationship of the loopers to the needle, and to this end, in the construction shown, the following means are provided, reference being had to Figs. 1, 6, 9, 20, 21 and 22. The vertical rock shaft 150, whose arm 149 is connected with the link 146 by the pin 147, has secured to its lower end a second arm 204 connected by a link 205 with a fork 206 through openings in the arms of which the looper shaft 79 extends, and whose arms embrace a collar 207 secured to said looper shaft, whereby, when the carrier 98 is shifted longitudinally by the lever 153 acting through the link 146, the shaft 79 will be correspondingly shifted longitudinally. It will be noted that the length of the arm 204 is greater than that of the arm 149 to compensate for the difference in distance, from the pivotal center of the needle bar guide 93, of the shaft 79 and needle bar carrier 98, respectively.

As above stated, the main cam 129 makes one complete rotation for each group of stitches $s$, $s'$ or $s2$, and the number of stitches of each group is determined by the shape of the cam grooves 127 and 197. Referring to Fig. 11, the cam groove 127 is formed with five radially offset portions, adapted to produce five complete lateral reciprocations of the needle in synchronism with the vertical reciprocations thereof, and with a concentric portion 231 during which the needle is caused to make two descents through the same hole in the button in order to form a knot or tying stitch, and the groove 197 is correspondingly formed to produce the requisite oscillatory movements of the loopers 82 and 83 to cause them to cooperate alternately with the needle in the formation of the attaching stitches and with a portion 273 so shaped as to cause one of said loopers to cooperate twice in succession with said needle when the latter descends twice through the same hole in the formation of the tying stitch. Consequently, each group of stitches will comprise ten attaching stitches and a tying stitch, the whole group requiring twelve vertical reciprocations of the needle.

The worm 25, which meshes with the worm gear 26 on the cam shaft 78, is pinned to the main shaft 76, and interposed between said worm and a collar 27 on the shaft 76 is a bushing 208 (Figs. 9, 27 and 31) in threaded engagement with an opening in the bracket 119. The bushing 208 is formed with a worm gear 210 which meshes with a form on a spindle 211 journalled in the top of the head and extending to the exterior thereof where it is provided with a head 212 by which it may be turned. By this means the shaft 76 and worm 25 may be adjusted longitudinally to a slight extent to correct any errors in the angular positioning of the cam shaft with reference to the main shaft which might interfere with the proper synchronizing of the vertical and horizontal movements of the needle.

The belt pulley 77 (Fig. 1) is loose on the shaft 76 and is adapted to be clutched thereto by a combined clutch and stop mechanism which as herein shown is similar to those shown and described in the patents to Mello, No. 1,227,643, May 29, 1917; and Reece No. 1,730,014, October 1, 1929. Referring to Figs. 28, 31, 34, 35 and 36 said mechanism includes a ring 276 carried by the pulley 77 and having a pin 277 which projects through a slot 278 in said pulley and is engaged by a spring 279 located in a recess in said pulley, whereby said ring is permitted a limited yielding angular movement with respect to the pulley, in order to cushion the shock of starting. The ring 276 has a shoulder 280 adapted to be engaged by a clutch dog 281 pivoted at 286 to a hub 282 keyed to the shaft 76 and normally urged into engagement with said shoulder by a spring 283 connecting said dog with an arm 284 fixed to said hub. The dog 281 is formed with a stop arm 285 adapted, when the connected parts are rotated in the direction of the arrows on Figs. 34, 35 and 36 to engage a head 287 yieldingly mounted by means of a spring 288 in the end of a stop arm 289 when the latter is in the position shown in full lines in Fig. 28, thereby disengaging the dog 281 from the shoulder 280 as shown in Fig. 34, and stopping the rotation of the shaft 76, the shock of stopping being cushioned by the spring 288. Recoil of the shaft under the influence of the spring 288 is prevented by a pawl 290 normally urged into a position to be engaged by a shoulder 291 on the hub 282 by means of a spring 292. The stop arm 289 is formed with a cam surface 293 which cooperates with a plunger 294 slidably mounted in the frame and engaging the pawl 290. The arrangement of the parts is such that, when the stop arm 289 is in the position shown in dotted lines in Fig. 28, the head 287 is out of the path of movement of the arm 285 of the dog 281, permitting the latter, under the influence of the spring 283, to engage the shoulder 280, as shown in Fig. 36, thereby connecting the pulley 77 and hub 282 for rotation in unison in the direction of the arrows. The cam surface 293 at the same time acts through the plunger 294 to hold the pawl 290 in the inoperative position shown in Fig. 36. When the stop arm 289 is in the position shown in full lines in Fig. 28, the head 287 will be engaged by the stop arm 285 to disconnect the parts and stop the machine, as above described. The cam surface 293 at this time permits the plunger 294 to be forced back by the spring 292, thereby permitting said spring to move the pawl 290 into operative position for engagement by the shoulder 291, as shown in Fig. 34.

Figure 13:
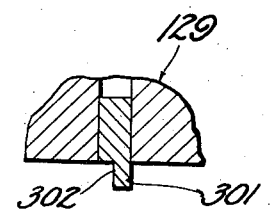
Fig. 13 is a section taken on the line 13—13 of Fig. 12.

The stop arm 289 is secured, as by a set screw 307, (Figs. 32 and 34), to a rock shaft 305 journalled in the frame and having secured thereto at the exterior of the casing an arm 306 (Figs. 1, 31 and 32) connected by a chain 295 (Fig. 1) with a suitable treadle (not shown), said arm being preferably provided with a spring pressed positioning plunger 296 (Figs. 31 and 32) adapted to engage either one of the two recesses or depressions 297 (Figs. 1 and 32) in the outer wall of the casing, thereby releasably retaining the stop arm 289 in either of the two positions shown in Fig. 28. To start the machine, the treadle is depressed, thereby rocking the shaft 305 in the direction to move the stop arm 289 into the position shown in dotted lines in Fig. 28. The machine having been started will continue to operate until automatically stopped. For this purpose the following mechanism is provided:

Secured, as by a set screw 308, (Fig. 34), to the inner end of the rock shaft 305 is an arm 298 having a bifurcated end between the bifurcations of which is pivoted a bunter 299 having a bevelled free end 300 (Fig. 32) adapted, when said bunter is in the elevated position shown in Figs. 28 and 30, to be engaged by a stud 301 (see also Figs. 11, 12, 13 and 32), projecting from the underside of the main cam 129 when the latter reaches an angular position corresponding to the completion of the tying stitch. Such engagement of the end 300 of the bunter 299 by the stud 301 causes said bunter to be forced toward the right in Fig. 28, thereby rocking the shaft 305 in a clockwise direction and moving the stop arm 289 into the position shown in full lines in Fig. 28 to disengage the clutch and stop the machine. The stud 301 is preferably notched, as shown at 302 in Fig. 13, so that the slight overthrow of the parts incidental to stopping the machine will bring said notch opposite the end of the bunter 299 in order to permit the machine to be again started by operation of the treadle.

A shaft 265 (Figs. 9, 25 and 26) is journalled in the frame and provided at the exterior of the casing with an operating handle 266 whereby it may be conveniently turned. Said shaft is formed with a flattened end portion 303 (Figs. 28, 29, 30, 32 and 34) adapted, when said shaft is turned into the position shown in Fig. 30, to hold the bunter 299 in its operative position in the path of movement of the stud 301 to stop the machine after one complete rotation of the cam 129 and the consequent completion of one group of attaching and tying stitches, as in sewing a two-hole button B, Fig. 2. When turned into the position shown in Figs. 29, 32 and 34, however, the flattened portion 303 permits the bunter 299 to be drawn by a spring 304 into the inoperative position shown in Fig. 29 out of the path of movement of the stud 301, thereby permitting the continued operation of the machine after one complete rotation of the cam 129, as in sewing two groups of stitches attaching a four-hole button B' (Fig. 3), until raised into its operative position by the following mechanism.

Pivoted as at 309 (Figs. 27, 28, 29 and 32), to the frame member 159 is a bell crank lever having one arm 310 in engagement with a vertically sliding plunger 311 guided in said frame member and adapted, when raised, to lift the bunter 299 from the inoperative position shown in Fig. 29 into the operative position shown in Figs. 28 and 30. The other arm 312 of said bell crank lever engages a cam or eccentric 313 formed on the hub of the gear 163 and cam 162 (see also Fig. 19). As above explained, the cam and gear assembly 162, 163, 313 makes one complete rotation to two complete rotations of the cam shaft 78 and main cam 129, and the eccentric 313 is so arranged that at the completion of one rotation of the gear 129 the bell crank 310, 312 and plunger 311 will be in the positions shown in Fig. 29, but at the completion of a second rotation of the cam 129 said parts will be in the position shown in Figs. 28 and 30, thereby lifting the bunter 299 into operative position and causing the stopping of the machine upon the completion of said second rotation.

It will thus be seen that with the shaft 265 in the position shown in Fig. 30 the machine will be stopped after the completion of one group of attaching and tying stitches, and when said shaft is in the position shown in Figs. 28 and 29, the machine will be stopped after the completion of two groups of attaching and tying stitches. By a suitable angular setting of the shaft 265 by means of the handle 266, the machine can be set to complete automatically either one group of stitches resulting from twelve vertical reciprocations of the needle, or two such groups of stitches. The shaft 265 is mounted for a limited longitudinal movement in opposition to a spring 314 (Figs. 9 and 25) interposed between the casing wall and a collar 315 on said shaft, said spring normally holding the shaft in the longitudinal position shown. Secured to the shaft 265 immediately adjacent the outer face of the casing wall is a disk 316 (Figs. 25 and 26), said disk being preferably formed integral with the handle 266 and the whole unit being secured to the shaft by a key 317. The disk 316 is provided adjacent its edge with two index characters 318 and also carries a stud 319 adapted to engage either of two apertures 320 in the casing wall, whereby the angular position of the shaft may be fixed with either of the index characters 318 opposite a fixed index or reference pin 321. By drawing the shaft 265 outwardly a limited distance against the tension of the spring 314, the stud 319 may be disengaged from the aperture 320 with which it is engaged, the shaft turned to bring the other index character 318 opposite the reference pin 321, and the shaft released to permit the spring 314 to reengage the pin 319 with the other aperture 320, thereby locking the shaft in readjusted position. As shown, the index characters 318 comprise the numerals "12" and "24" disposed at 90° to one another. The arrangement is such that when the numeral "12" is opposite the index pin 321, the shaft 265 is in the position shown in Fig. 30 so as to stop the machine after one rotation of the cam 129 and consequently upon the completion of one group of attaching and tying stitches and when the numeral "24" is opposite the index pin, the shaft 265 is in the position shown in Figs. 28 and 29, so that the machine is not stopped until after two rotations of the cam 129 and the completion of two groups of stitches.

In order to set the machine to sew a two-hole button B (Fig. 2), the following adjustments are made. The locking pin 170 (Figs. 15 and 18) is disengaged from the opening 171 in the index plate 172, permitting the spring 178 to turn the yoke 166 and carry the pin 151 into a position coaxial with the shaft 154, as shown in Figs. 23 and 24. The slide 132 (Figs. 5, 9 and 14) is adjusted, in accordance with the lateral spacing of the holes $h$, $hx$ (Fig. 2), to position the studs 120 (Figs. 17, 23 and 24) and 191 (Fig. 20) at the proper points in the grooves in their respective lever arms 122 and 193 to give the required amplitude of lateral vibration to the needle and loopers. The shaft 265 (Figs. 9, 25 and 26) is angularly set to stop the machine upon the completion of one group of stitches, that is to say, the index numeral "12" is set opposite the reference pin 321. The starting treadle (not shown) is then depressed and acts through the chain 295 (Fig. 1) and arm 306 to rock the shaft 305 (Fig. 28) in a counter-clockwise direction, thereby engaging the head 287 of the stop arm 289 from the arm 285 (Figs. 34, 35 and 36) of the clutch dog 281 and starting the machine. During the operation of the machine the rock shaft 305 is retained in the position into which it has been moved by the starting treadle by engagement of the plunger 296 (Fig. 32) with the appropriate recess 297. The machine thereupon operates to cause the needle to descend alternately through the holes $h$ and $hx$ and the looper mechanism to cooperate therewith to form a group of attaching stitches, and thereafter to cause said needle to descend twice through the same hole to form a tying stitch. Upon the completion of this stitch group, i. e., upon the completion of one rotation of the cam 129, the stud 301 (Figs. 30 and 32) engages the end of the bunter 299, forcing the same toward the right and thereby rocking the shaft 305 in a clockwise direction and moving the stop arm 289 into the position shown in full lines in Fig. 28. The arm 285 of the clutch dog 281 thereupon engages the head 287 of said stop arm, thus disengaging the clutch and positively stopping the shaft 76, the impact being cushioned by the spring 288. Movement of the stop arm 289 into stopping position causes the cam surface 293 (Fig. 31) on the stop arm 289 to release the plunger 294 (Figs. 31 and 34), so that the spring 292 moves the pawl 290 into position to be engaged by the shoulder 291 to check the recoil of the spring 288, as shown in Fig. 34.

In order to set the machine to sew a four-hole button B' (Fig. 3), the locking pin 170 (Figs. 15 and 18) is engaged with the opening 171 in the index plate 172, and the connected index plate and hand lever 169 turned until the proper graduation (in accordance with the fore and aft spacing of the pairs of holes $h^1$, $h^2$, and $h^3$, $h^4$) on the scale 175 is brought opposite the index mark 176. This positions the stud 151 (Fig. 17) at the proper point in the groove 152 in the lever arm 153 to produce the requisite fore and aft shifting movement of the needle and looper mechanism in accordance with said spacing. The adjustment for lateral hole spacing is made by the slide 132 (Figs. 5, 9 and 14) in the same manner as above described in the case of a two-hole button. The shaft 265 (Figs. 9, 25 and 26) is angularly set with the index numeral "24" opposite the reference pin 321, thereby positioning the flattened end portion 303 thereof as shown in Figs. 28 and 29. The machine then operates as above described to sew a group of attaching and tying stitches through the holes $h^1$ and $h^2$. Upon the completion of this stitch group, the cam 129 will have made one complete rotation, but at this time the eccentric 313 permits the bell crank 310, 312 and plunger 311 to assume the positions shown in Fig. 29, so that the bunter 299 is not engaged by the stud 301, and the operation of the machine continues. Also at the completion of the first stitch group and the first rotation of the cam 129, the cam 162 (Figs. 17, 19 and 22) acts, through the slide 156, rock shaft 154, lever arm 153, link 146, arm 149, and rock shaft 150, to shift the needle and looper mechanism rearwardly into position to cooperate with the holes $h^3$ and $h^4$, whereupon a second group of stitches is sewn through the latter holes. Meantime, the eccentric 313 has been turned into a position to rock the bell crank 310, 312 and lift the plunger 311 and bunter 299 into the position shown in Figs. 28 and 30. Consequently, upon the completion of the second group of stitches and the second rotation of the cam 129, the stud 301 will engage the bunter 299 and stop the machine as above described.

If it be desired to sew a two-hole button with a number of stitches greater than that of the single stitch group for which the machine is designed, the parts may be so adjusted as to sew two groups of stitches through the same pair of holes, each group being completed by the usual tying stitch. For this purpose the locking pin 170 and hand lever 169 (Figs. 15 and 18) are released to position the pin 151 (Fig. 17) concentric with the shaft 154, and the shaft 265 (Figs. 25 and 26) turned to bring the index numeral "24" opposite the reference pin 321, the other adjustments being as above described. The operation of the machine, after depression of the starting treadle, will then be as above described in connection with the sewing of a four-hole button except that there will be no fore and aft shifting of the needle and looper mechanism after the completion of the first stitch group, so that both groups of stitches will be sewn through the same pair of holes.

It will be noted that the adjustment of the studs 120 and 191 in the grooves 121 and 192, for the purpose of determining the amplitude of lateral vibration or oscillation of the needle and loopers in accordance with the lateral spacing of the holes in their respective rows, is entirely independent of the adjustment of the stud 151 in the groove 152 which determines the amplitude of fore and aft shifting movement of said needle and loopers in accordance with the spacing of the pairs or rows of holes. The machine is therefore adaptable to the sewing of four-hole buttons in which the spacing of the rows is different from the spacing of the individual holes in the respective rows, in other words, in which the holes are arranged in the form of an elongated rectangle as distinguished from a square.

The above described stopping mechanism for determining the number of groups of stitches is not claimed herein, being covered by the claims of a divisional application filed June 6, 1936, Serial No. 83,943.

I claim:

1. In a machine for sewing on buttons, the combination with means for holding and positioning a button, of stitch forming mechanism including a needle bar and a needle carried thereby, said needle bar being reciprocable longitudinally of the needle to cause the needle to penetrate the work and being also movable in a plurality of directions transverse to its direction of reciprocation to position the needle with respect to the several holes of a plurality of pairs or rows of holes in the button.

2. In a machine for sewing on a button having a plurality of pairs or rows of holes, stitch forming mechanism including a needle, means for reciprocating the needle longitudinally to cause it to penetrate the work, and mechanism for moving said needle laterally in one direction to cause the same to pass successively through the several holes of one pair or row and for moving said needle laterally in another direction to cause the same to pass successively through holes of different pairs or rows.

3. In a machine for sewing on buttons, stitch forming mechanism including a needle bar and a needle carried thereby, a pair of guides for said needle bar, means for reciprocating the needle bar in said guides, one of said guides being mounted for angular movement in a plurality of directions, a carrier for the other of said guides, and mechanism for moving said carrier in a plurality of directions laterally of said needle bar.

4. In a machine for sewing on buttons, stitch forming mechanism including a needle bar and a needle carried thereby, a pair of guides for said needle bar, means for reciprocating the needle bar in said guides, one of said guides being mounted for angular movement in a plurality of directions, a carrier for the other of said guides, and mechanism for swinging said carrier laterally and reciprocating it longitudinally.

5. In a machine for sewing on buttons, stitch forming mechanism including a needle and cooperating looper elements, said needle being longitudinally reciprocable to penetrate the work and cooperate with said looper elements, and being also laterally movable in one direction to form a group of superimposed stitches and in another direction to determine the location of the group of stitches so formed, and said looper elements being also movable in both of said last named directions.

6. In a machine for sewing on buttons, stitch forming mechanism including a needle and cooperating looper elements, means for reciprocating said needle longitudinally to cause the same to penetrate the work, mechanism for moving said needle laterally in one direction to form a group of superimposed stitches and in another direction to determine the location of the group of stitches so formed, and mechanism for oscillating said looper elements to cause them to cooperate with the needle when the latter is reciprocated and moved laterally in one of said directions and for shifting the position of said looper elements to maintain the cooperative relationship when said needle is moved laterally in the other of said directions.

7. In a machine for sewing on buttons, stitch forming mechanism including a needle and cooperating looper elements, a needle bar by which said needle is carried, a shaft on which said looper elements are mounted, a pair of guides for said needle bar, means for reciprocating the needle bar in said guides, one of said guides being mounted for angular movement in a plurality of directions, a carrier for the other of said guides, means for swinging said carrier laterally of said needle bar and said shaft, means for shifting it longitudinally of said shaft, means for oscillating said looper shaft, and means for shifting it longitudinally.

8. In a sewing machine, stitch forming elements, means for operating the same to form a group of superimposed stitches, and means for shifting said elements back and forth between two stitching positions after the formation of a predetermined number of stitches in each of said positions.

9. In a machine for sewing on a button having a plurality of pairs or rows of holes, stitch forming mechanism including a needle, means for reciprocating the needle longitudinally to cause it to penetrate the work, means for moving said needle laterally in one direction to cause the same to pass successively through the several holes of one pair or row, means for moving said needle laterally in another direction to cause the same to pass successively through holes of different pairs or rows, and means for varying the amplitude of said lateral movements in accordance with the spacing of the holes.

10. In a machine for sewing on a button having a plurality of pairs or rows of holes, stitch forming mechanism including a needle, means for reciprocating the needle longitudinally to cause it to penetrate the work, means for moving said needle laterally in one direction to cause the same to pass successively through the several holes of one pair or row, means for moving said needle laterally in another direction to cause the same to pass sucessively through holes of different pairs or rows, and means for varying the extent of movement in said last named direction in accordance with the spacing of said pairs or rows of holes.

11. In a machine for sewing on buttons, stitch forming mechanism including a needle and cooperating looper elements, means for reciprocating said needle longitudinally to cause the same to penetrate the work, mechanism for moving said needle laterally in two directions transverse to each other, mechanism for oscillating said looper elements to cause them to cooperate with the needle when the latter is reciprocated and moved laterally in one of said directions and for shifting the position of said looper elements to maintain the cooperative relationship when said needle is moved laterally in the other of said directions, and means whereby the amplitude of the shifting movement of the looper elements and of said last named lateral movement of the needle may be simultaneously and correspondingly varied.

12. In a machine for sewing on buttons having different numbers or arrangements of holes, stitch forming mechanism including a needle, means for reciprocating the needle longitudinally to cause it to penetrate the work, means for moving said needle laterally in one direction to cause the same to pass successively through the several holes of one pair or row, and means for moving said needle laterally in another direction to cause the same to pass successively through holes of different pairs or rows, said last named means being capable of being rendered operative or inoperative to adapt the machine to buttons having one or more pairs or rows of holes.

13. In a machine for sewing on buttons, stitch forming mechanism including a needle and operating mechanism therefor including means for reciprocating said needle longitudinally, means for vibrating said needle laterally in one direction to form a group of superimposed stitches, and means for moving said needle laterally in a direction transverse to said first named direction between successive groups of superimposed stitches.

14. In a machine for sewing on buttons, stationary work holding means, stitch forming mechanism, means for operating said stitch-forming mechanism to form stitches in groups each including a predetermined number of attaching stitches and a tying stitch, and means for shifting the position of said mechanism between the formation of successive groups of stitches.

15. In a machine for sewing on a button having a plurality of pairs or rows of holes, stitch forming mechanism including a needle, means for reciprocating the needle longitudinally to cause it to penetrate the work, means for moving said needle laterally in one direction to cause the same to pass successively through the several holes of one pair or row, means for moving said needle laterally in another direction to cause the same to pass alternatively through holes of different pairs or rows, and means whereby the amplitude of each of said lateral movements may be varied independently of the other in accordance with the spacing of the holes in the several rows and the spacing of the several rows respectively.

16. In a machine for sewing on buttons, stitch forming mechanism including a needle and cooperating looper elements, said needle being longitudinaly reciprocable and laterally movable in one direction to penetrate the work and cooperate with said looper elements in the formation of a group of superimposed stitches, and being also laterally movable in another direction to determine the location of the stitches so formed, and said looper elements being also movable in at least one of said last named directions.

17. In a machine for sewing on buttons, stitch forming mechanism including a needle bar and a needle carried thereby, said needle bar being reciprocable longitudinally of the needle to cause the needle to penetrate the work and being also movable laterally in one direction to form groups of superimposed stitches and in another direction to determine the location of the several groups of stitches so formed.

18. In a machine for sewing on buttons, the combination with means for holding and positioning a button, of stitch forming mechanism including a needle and cooperating looper elements, said needle being longitudinally reciprocable to penetrate the work and cooperate with said looper elements, and being also laterally movable in two directions transverse to each other to position the same with respect to the several holes of a plurality of pairs or rows of holes in the button, and said looper elements being also movable in both of said last named directions.

19. In a machine for sewing on buttons, the combination with means for holding and positioning a button, of stitch forming mechanism including a needle and cooperating looper elements, means for reciprocating said needle longitudinally to cause the same to penetrate the work, mechanism for moving said needle laterally in two directions transverse to each other to position the same with respect to the several holes of a plurality of pairs or rows of holes in the button, and mechanism for oscillating said looper elements to cause them to cooperate with the needle when the latter is reciprocated and moved laterally in one of said directions and for shifting the position of said looper elements to maintain the cooperative relationship when said needle is moved laterally in the other of said directions.

20. In a machine for sewing on buttons, the combination with means for holding and positioning a button, of stitch forming elements, means for operating the same to form stitches through a pair of holes in the button, and means for shifting said elements between two stitching positions after the formation of a predetermined number of stitches in each of said positions to cause them to form stitches through different pairs of holes in the button.

21. In a machine for sewing on buttons, the combination with means for holding and positioning a button having a plurality of pairs of holes, stitch forming mechanism including a needle and operating mechanism therefor including means for reciprocating said needle longitudinally, means for vibrating said needle laterally in one direction to cause the same to pass alternately through the holes of one pair, and means for moving said needle laterally in a direction transverse to said first named direction between groups of a predetermined number of longitudinal reciprocations thereof to position the same for passing alternately through the holes of different pairs.

22. In a machine for sewing on buttons, the combination wtih means for holding and positioning a button, of stitch forming mechanism including a needle and cooperating looper elements, said needle being longitudinally reciprocable to penetrate the work and cooperate with said looper elements and being also laterally movable in two directions transverse to each other to position the same with respect to the several holes of a plurality of pairs or rows of holes in the button, and said looper elements being also movable in at least one of said last-named directions.

23. In a sewing machine, in combination, a frame, work holding means operable to clamp and release the work but otherwise occupying a fixed position in said frame, a needle bar, and a needle carried thereby, said needle bar being reciprocable in said frame longitudinally of the needle to cause the needle to penetrate the work, and being also movable in said frame in a plurality of directions transverse to its direction of reciprocation.

24. In a sewing machine, in combination, a frame, work holding means operable to clamp and release the work but otherwise occupying a fixed position in said frame, a needle bar, a needle carried thereby, and a mounting for said needle bar carried by said frame, said needle bar being reciprocable in said mounting longitudinally of the needle to cause the needle to penetrate the work and being also movable in said mounting in a plurality of directions transverse to its direction of reciprocation.

25. In a sewing machine, in combination, a needle bar carrying a needle having a thread eye therethrough, means for reciprocating the needle bar longitudinally of the needle to pass the eye of the latter back and forth through the work, and means to oscillate the needle bar transversely of said longitudinal movement in a plurality of planes differently disposed with respect to the axis of said eye.

26. In a sewing machine, stitch forming elements, means for operating the same to form a group of superimposed stitches, and means for shifting said elements from one stitching position to another after the formation of a predetermined number of stitches in the first position.

27. In a machine for sewing on buttons, the combination with means for holding and positioning a button, of stitch forming elements, means for operating the same to form stitches through a pair of holes in the button, and means for shifting said elements from one stitching position to another after the formation of a predetermined number of stitches in the first position to cause them to form stitches through different pairs of holes in the button.

28. In a machine for sewing on buttons, stitch-forming mechanism including a needle and cooperating looper elements, said needle being longitudinally reciprocable to penetrate the work and cooperate with said looper elements, and being also laterally movable in one direction to form a group of superimposed stitches and in another direction to determine the location of another group of stitches, and said looper elements being also movable in both of said last named directions.

FRANKLIN A. REECE.